May 20, 1952 R. W. STELZEL Re. 23,497
STARTER JAW ACTUATING MECHANISM
Original Filed Nov. 7, 1949
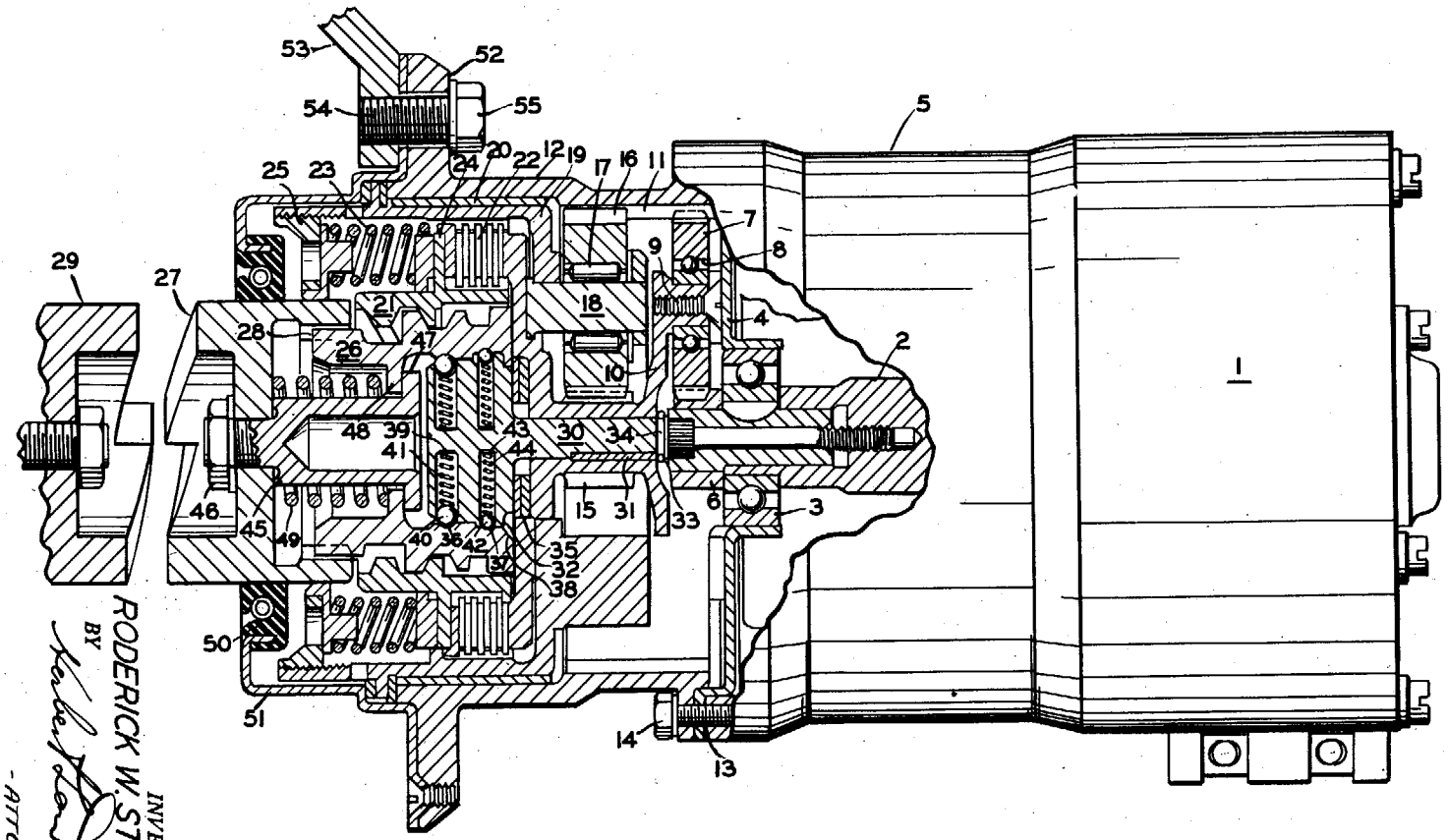
INVENTOR.
RODERICK W. STELZEL
BY
Herbert L. Davis Jr.
- ATTORNEY -

Reissued May 20, 1952

Re. 23,497

UNITED STATES PATENT OFFICE 23,497

STARTER JAW ACTUATING MECHANISM

Roderick W. Stelzel, Hohokus, N. J., assignor to Bendix Aviation Corporation, Teterboro, N. J., a corporation of Delaware Original No. 2,572,532, dated October 23, 1951, Serial No. 125,923, November 7, 1949. Application for reissue February 18, 1952, Serial No. 271,989

6 Claims. (Cl. 74—7)

Matter enclosed in heavy brackets [ ] appears in the original patent but forms no part of this reissue specification; matter printed in italics indicates the additions made by reissue.

The present invention relates to engine starters and particularly to starter jaw advancing mechanism.

In engine starters some means are necessary to advance the starter jaw into engagement with the engine jaw upon energization of the starter. One method used is a friction ring in contact with the starter jaw to hold the jaw momentarily against rotation to enable the screw shaft and spline nut to coact to move the jaw into engagement. Also the friction ring serves to hold the starter jaw in its retracted position when the engine is running. This method has numerous disadvantages, some of which are that friction means are present during the operation of the starter, the friction ring becomes worn and does not have sufficient friction to hold the jaw against rotation and to hold the jaw in its retracted position when the engine is running. This is especially a disadvantage when the starter is mounted with the jaws downward as is required in many installations. Also the friction means do not perform satisfactorily when low temperatures are encountered.

It is an object of my invention to provide a positive jaw advancing mechanism incorporating positive holding means that will overcome the above difficulties.

Another object of the invention is to provide an improved starter.

Another object is to provide an improved starter for operation at low temperatures.

Another object is to provide an improved jaw advancing mechanism for use in engine starters.

Another object is to provide means for preventing the jaws from becoming engaged by vibration when the engine is running.

The above and other objects and features of the invention will appear more fully hereinafter from a consideration of the following description taken in connection with the accompanying drawings wherein one embodiment of the invention is illustrated by way of example.

In the drawing:

The single figure is a sectional view of an engine starter embodying one form of the invention.

Referring to the drawing, the device therein shown comprises a starter assembly including, in general, a motor 1 having a driving shaft 2 rotatably supported by a bearing 3 mounted in end wall 4 of motor housing 5. A pinion 6, shown as integral with the shaft 2 meshes with planet gears 7. The planet gears 7 are rotatably supported by ball bearings 8 mounted on stub shafts 9 carried by spider cage 10. The planet gears 7 mesh with a ring gear 11 shown as integral with gear housing 12. The gear housing 12 is secured to the motor housing 5 by studs 13 and nuts 14 as shown or by other suitable means.

Integral with the spider cage 10 is a pinion gear 15 adapted to engage planet gears 16 which also engage the ring gear 11. The gears 16 are supported by bearings 17 mounted on stub shafts 18 carried by a drum member 19. The drum member or barrel 19 is rotatably mounted in the housing 12 by bearing 20.

The barrel 19 is connected for the transmission of rotary motion to axially stationary spline nut 21 through a torque limiting disc pack 22. The disc pack 22 comprises a plurality of friction discs alternately splined to the inner face of the barrel 19 and the outer face of the spline nut 21. The discs of the pack 22 are forced into frictional engagement with each other by a plurality of circumferentially spaced springs 23 compressed between a flange 24 on the spline nut 21 and an adjustable nut 25 threaded into the barrel 19 and set so that the disc pack 22 will slip at a predetermined torque.

The long lead internal threads of the spline nut 21 mesh with mating threads of screw shaft 26 which is connected to starter jaw 27 by axial splines 28 for rotation therewith.

The present invention provides novel means for actuating the starter jaw 27 into engagement with a crank shaft 29 or extension thereof of the engine to be started.

The pinion gear 15 has a shaft 30 extending axially therefrom into the barrel 19. The shaft 30 is secured to the gear 15 by a key 31, or in any other suitable manner such as splines for rotation therewith. The shaft 30 terminates in an enlarged portion or head 32 and is axially positioned by means of a retaining ring 33 adapted to fit in a groove 34 in the shaft 30 and thrust washers 35 positioned between the head 32 and the radial wall of the barrel 19. The screw shaft 26 has an internally helical threaded portion 36 terminating in a circumferential groove 37. The end of the screw shaft 26 adjacent to the groove 37 has a chamfer 38. The head 32 has a plurality of holes 39 spaced around its circumference and extending radially inward thereof. The holes 39 are so positioned in relation to each other so that the center lines thereof form an angle equal to the pitch angle of the helical threaded portion 36. A ball 40 adapted to mesh with the threaded portion 36 is secured in each hole 39 by peening the edge of the hole 39 or in any other suitable manner. Springs 41 urge the balls 40 radially outward into engagement with the threaded portion 36. A plurality of balls 42 adapted to mesh with the circumferential groove 37 when the shaft 26 is in its retracted position are mounted in the head 32 in holes 43 spaced circumferentially around the head 32. The balls 42 are retained in the holes 43 by peening or in any other suitable manner. Springs 44 urge the balls 42 radially outward into operative position.

The clutch jaw 27 is retained in operative position relative to the screw shaft 36 by a mesh rod 45 secured to the clutch jaw 27 by a nut 46. The mesh rod 45 extends axially into the screw shaft 26 and terminates in a circumferential flange 47. A flange 48 of screw shaft 26 extending radially inwardly coacts with the flange 47 to limit the outward movement of the mesh rod 45. A spring 49 coacts with the flange 48 to bias the jaw 27 outward.

An oil seal 50 surrounds the outer circumference of the clutch jaw 27 and is held in position by a bracket 51 clamped between the flange 52 on the gear housing 12 and engine crank case 53 by means of studs 54 and nuts 55 or in any other suitable manner.

In operation, when the motor 1 is energized rotary motion is imparted to the barrel 19 by means of the planetary gear system which includes the pinion 15. The shaft 30 being keyed to the pinion 15 rotates therewith. The balls 40 coact with the helical threaded portion 36 providing a screw-like action which causes the balls 42 to be ratcheted out of circumferential groove 37, the force of the springs 41 being greater than that of the springs 44 and drives the screw shaft axially outward. This action is accelerated by the balls 42 pressing on the chamfer or ramp 38 thus giving the screw shaft a snap action. When the jaw 27 is in its engaged position, the balls 40 will have traveled out of the helical threaded portion 36 into the circumferential groove 37. The outward travel of the balls 40 being limited by the peening will have a clearance from the sides and bottom of the circumferential groove 37, thus eliminating all friction and drag of these parts when the engine is being cranked. Should the jaws abut before meshing, the springs 41 will yield and permit the balls 40 to ratchet over the threads 36. Also undue resistance to axial movement of the starter jaw 27 will cause the balls 40 to ratchet in like manner. Inasmuch as the speed of rotation of the shaft 30 is greater than that of the barrel 19, the jaw 27 is moved into engagement with a relatively small amount of rotation of the barrel. The long lead splined connection between the spline nut 21 and the screw shaft 26 permits the screw shaft 26 to be pushed along the splines by the screw-like action of the connection between the shaft 30 and the screw shaft 26.

Upon the engine starting, the jaw 29 overrides the jaw 27 forcing it inward wherein the balls 40 will override the threads 36. Upon the jaw 27 and screw shaft returning to the retracted position, the balls 42 engaged the groove 37 and prevent movement from the retracted position when the engine is running.

Thus a positive drive to effect axial movement of the screw shaft is provided which insures positive meshing under all conditions and also provide positive means for retaining the jaw in its retracted position when the engine is running. This last feature is desirable, especially when the starter is mounted with the jaw downward as is necessary for some installations.

Although only one embodiment of the invention has been illustrated and described, various changes in the form and relative arrangements of the parts may be made to suit requirements.

What is claimed is:

1. For use in an engine starter, the combination of an assembly comprising an axially stationary rotatable spline nut, a screw shaft connected for rotation with and axial movement relative to said spline nut, said screw shaft having an internally threaded portion, and an annular groove adjacent thereto, a shaft member concentric with and extending into said screw shaft, said shaft member having first ball receiving openings at spaced intervals along a helical path corresponding to the pitch of said internally threaded portion, first balls positioned in said openings, first spring means for resiliently biasing said balls into engagement with said internally threaded portion, second ball receiving openings in said shaft spaced circumferentially around said shaft, second balls positioned in said second openings, second spring means for biasing said second balls into engagement with said annular groove to hold said screw shaft in a retracted position, said first spring means being greater than said last spring means whereby upon rotation of said shaft said screw shaft is actuated to an extended position.

2. The combination as defined in claim 1 and including a conical ramp portion of said screw shaft, said ramp portion being positioned to coact with said second spring biased balls when said screw shaft is in a partially extended position to aid axial movement of said screw shaft to the extended position.

3. In an engine starter, the combination of an assembly comprising an axially stationary rotatable spline nut, a screw shaft in said nut and splined thereto for axial movement relative to and rotation therewith, a starter jaw member adapted for rotation with and axial movement by said screw shaft, means including a positive driven member for actuating said screw shaft to urge said starter jaw axially to an engine engaging position, yieldable means for drivably connecting said member to said screw shaft, said last means being adapted to release said connection when the opposition to axial movement of said starter jaw exceeds a predetermined maximum, holding means for retaining said screw shaft in a retracted position, said last means being adapted to yield in response to actuation of said screw shaft.

4. The combination as defined in claim 3 and including a ramp portion of said screw shaft adapted to coact with said holding means when said screw shaft is extended to aid linear movement of said screw shaft.

5. In an engine starter, the combination of an assembly comprising rotatable driving means, an axially stationary rotatable spline nut, a planet gear assembly for connecting said spline nut to said driving means, a screw shaft interposed in said splined nut and having mating splines thereon, a starter jaw member splined to said screw shaft for rotation and biased for axial movement therewith, said screw shaft having an internal helical threaded portion and an internal annular groove, a shaft member concentric with said screw shaft and extending therein, and connected to said driving means for rotation at a different rate than said spline nut, means including a plurality of spring biased balls associated with said shaft member and adapted to engage said helical threaded portion to provide a screw action for moving said screw shaft axially to an engine engaging position, said spring bias balls being yieldable to permit ratcheting over said helical threads when opposition to said axial movement exceeds a predetermined maximum value, a second plurality of spring biased balls associated with said shaft member and adapted to engage said annular groove when said screw shaft is in a retracted position, said second spring biased balls being yieldable above a predetermined maximum.

6. [For use] *The combination* in an engine starter of the type having an axially stationary rotatably splined nut, a screw shaft splined to said spline nut for rotation with and axial movement relative thereto, a starter jaw connected for rotation with and yieldably biased for axial movement with said screw shaft; of [a] jaw advancing means comprising a screw shaft having an internal helical threaded portion, an internal annular groove portion and a ramp portion, a shaft member concentric with said screw shaft and having an enlarged portion extending therein, first yieldable means for connecting said screw shaft and said enlarged portion to provide a screw action for actuating said screw shaft axially to an extended position, second yieldable means for engaging said annular groove portion for retaining said screw shaft in a retracted position, said second yieldable means being adapted to yield to said screw action to permit linear movement of said screw shaft and to coact with said ramp portion upon linear movement to provide a snap action to said screw shaft.

RODERICK W. STELZEL.

No references cited.